US012783550B2

(12) United States Patent
Nguyen et al.

(10) Patent No.: US 12,783,550 B2
(45) Date of Patent: Nov. 3, 2026

(54) SYSTEMS AND METHODS FOR IMPROVING COMPUTATIONAL SPEED OF PLANNING BY TRACKING DEPENDENCIES IN HYPERCUBES

(71) Applicant: Workday, Inc., Pleasanton, CA (US)

(72) Inventors: Ngoc Nguyen, Cupertino, CA (US); Darren Kermit Lee, Sunnyvale, CA (US); Shuyuan Chen, Palo Alto, CA (US); Ritu Jain, Fremont, CA (US); Francis Wang, Foster City, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 19/077,933

(22) Filed: Mar. 12, 2025

(65) Prior Publication Data

US 2026/0119529 A1 Apr. 30, 2026

Related U.S. Application Data

(63) Continuation of application No. 18/203,124, filed on May 30, 2023, now Pat. No. 12,277,142, which is a continuation of application No. 17/670,322, filed on Feb. 11, 2022, now Pat. No. 11,704,339, which is a continuation of application No. 16/397,600, filed on Apr. 29, 2019, now Pat. No. 11,281,696.

(60) Provisional application No. 62/664,429, filed on Apr. 30, 2018.

(51) Int. Cl.
*G06F 16/00* (2019.01)
*G06F 9/38* (2018.01)
*G06F 12/0891* (2016.01)
*G06F 16/22* (2019.01)
*G06F 16/248* (2019.01)
*G06F 16/28* (2019.01)

(52) U.S. Cl.
CPC .......... *G06F 16/283* (2019.01); *G06F 9/3838* (2013.01); *G06F 12/0891* (2013.01); *G06F 16/2264* (2019.01); *G06F 16/248* (2019.01)

(58) Field of Classification Search
CPC .................................................... G06F 16/283
See application file for complete search history.

(56) References Cited

U.S. PATENT DOCUMENTS

2007/0130116 A1* 6/2007 Cras ...................... G06F 16/283
2014/0379666 A1* 12/2014 Byron .................. G06F 40/177
707/687

* cited by examiner

*Primary Examiner* — Ajith Jacob
(74) *Attorney, Agent, or Firm* — Van Pelt, Yi & James LLP

(57) ABSTRACT

A system for updating a hypercube includes an interface and a processor. The interface is configured to receive an indication to update a cell of the hypercube. The processor is configured to determine a primary dimension value associated with the cell; determine a group of dependencies based at least in part on the primary dimension value, wherein a dependency of the group of dependencies comprises one or more primary dimension values and a pattern; for the dependency of the group of dependencies, determine a set of source locations based at least in part on the one or more primary dimension values and the pattern; and mark the set of source locations as invalid.

17 Claims, 15 Drawing Sheets

A Slice of SALE 400

Level: L1
Customer: ATT
SKU: Home_Service 408 410

| Account | Week1 | Week2 | Week3 | Week4 | Week5 | Week6 |
|---|---|---|---|---|---|---|
| Quantity | 10 | 5 | | | | |
| AvgSellingPrice | 20 | 20 | | | | |
| Revenue | 200 | 100 | | | | |
| Commission | 2 | 5 | | | | |
| Freight | 5 | 2.5 | | | | |
| Direct_Cost | 10 | 5 | | | | |

A Slice of COST 402

Level: L4
SKU: Home_Service

| Account | Week1 | Week2 | Week3 | Week4 | Week5 | Week6 |
|---|---|---|---|---|---|---|
| StandardCost/Unit | 1 | 1 | | | | |

A Slice of GL 404

Level: L1

| Account | Week1 | Week2 | Week3 | Week4 | Week5 | Week6 |
|---|---|---|---|---|---|---|
| Commission | 1% | 5% | | | | |

Global Acct 406

| Account | Week1 | Week2 | Week3 | Week4 | Week5 | Week6 |
|---|---|---|---|---|---|---|
| FreightRate | 1% | 5% | | | | |

FIG. 4

A Slice of SALE 500

Level: L1
Customer: ATT
SKU: Home_Service

| Account (Time →) | Week1 | Week2 | Week3 | Week4 | Week5 | Week6 |
|---|---|---|---|---|---|---|
| Quantity | 10 | 5 | | | | |
| AvgSellingPrice | 20 | 20 | | | | |
| Revenue | 200 | 100 | | | | |
| Commission | 2 | 5 | | | | |
| Freight | 5 | 2.5 | | | | |
| Direct_Cost | 10 | 5 | | | | |

510

A Slice of COST 502

Level: L4
SKU: Home_Service

| Account (Time →) | Week1 | Week2 | Week3 | Week4 | Week5 | Week6 |
|---|---|---|---|---|---|---|
| StandardCost/Unit | 1 | 1 | | | | |

A Slice of GL 504

Level: L1

508

| Account (Time →) | Week1 | Week2 | Week3 | Week4 | Week5 | Week6 |
|---|---|---|---|---|---|---|
| Commission | 1% | 5% | | | | |

Global Acct 506

| Account (Time →) | Week1 | Week2 | Week3 | Week4 | Week5 | Week6 |
|---|---|---|---|---|---|---|
| FreightRate | 1% | 5% | | | | |

FIG. 5

A Slice of SALE 600

Level: L1
Customer: ATT
SKU: Home_Service

| Account | Week1 | Week2 | Week3 | Week4 | Week5 | Week6 |
|---|---|---|---|---|---|---|
| Quantity | 10 | 5 | | | | |
| AvgSellingPrice | 20 | 20 | | | | |
| Revenue | 200 | 100 | | | | |
| Commission | 2 | 5 | | | | |
| Freight | 5 | 2.5 | | | | |
| Direct_Cost | 10 | 5 | | | | |

Time · 610

A Slice of COST 602

Level: L4
SKU: Home_Service

| Account | Week1 | Week2 | Week3 | Week4 | Week5 | Week6 |
|---|---|---|---|---|---|---|
| StandardCost/Unit | 1 | 1 | | | | |

Time

A Slice of GL 604

Level: L1

| Account | Week1 | Week2 | Week3 | Week4 | Week5 | Week6 |
|---|---|---|---|---|---|---|
| Commission | 1% | 5% | | | | |

Time

Global Acct 606

| Account | Week1 | Week2 | Week3 | Week4 | Week5 | Week6 |
|---|---|---|---|---|---|---|
| FreightRate | 1% | 5% | | | | |

Time

608

FIG. 6

A Slice of SALE 700

Level: L1
Customer: ATT
SKU: Home_Service

| Account | Week1 | Week2 | Week3 | Week4 | Week5 | Week6 |
|---|---|---|---|---|---|---|
| Quantity | 10 | 5 | | | | |
| AvgSellingPrice | 20 | 20 | | | | |
| Revenue | 200 | 100 | | | | |
| Commission | 2 | 5 | | | | |
| Freight | 5 | 2.5 | | | | |
| Direct_Cost | 10 | 5 | | | | |

(Time across the Week columns)

710

A Slice of COST 702

Level: L4
SKU: Home_Service

| Account | Week1 | Week2 | Week3 | Week4 | Week5 | Week6 |
|---|---|---|---|---|---|---|
| StandardCost/Unit | 1 | 1 | | | | |

708

A Slice of GL 704

Level: L1

| Account | Week1 | Week2 | Week3 | Week4 | Week5 | Week6 |
|---|---|---|---|---|---|---|
| Commission | 1% | 5% | | | | |

Global Acct 706

| Account | Week1 | Week2 | Week3 | Week4 | Week5 | Week6 |
|---|---|---|---|---|---|---|
| FreightRate | 1% | 5% | | | | |

FIG. 7

SYSTEMS AND METHODS FOR IMPROVING COMPUTATIONAL SPEED OF PLANNING BY TRACKING DEPENDENCIES IN HYPERCUBES

CROSS REFERENCE TO OTHER APPLICATIONS

This application is a continuation of U.S. patent application Ser. No. 18/203,124 entitled SYSTEMS AND METHODS FOR IMPROVING COMPUTATIONAL SPEED OF PLANNING BY TRACKING DEPENDENCIES IN HYPERCUBES filed May 30, 2023, now U.S. Pat. No. 12,277,142, which is incorporated herein by reference for all purposes, which is a continuation of U.S. patent application Ser. No. 17/670,322 entitled SYSTEMS AND METHODS FOR IMPROVING COMPUTATIONAL SPEED OF PLANNING BY TRACKING DEPENDENCIES IN HYPERCUBES filed Feb. 11, 2022, now U.S. Pat. No. 11,704,339, which is incorporated herein by reference for all purposes, which is a continuation of U.S. patent application Ser. No. 16/397,600 entitled SYSTEMS AND METHODS FOR IMPROVING COMPUTATIONAL SPEED OF PLANNING BY TRACKING DEPENDENCIES IN HYPERCUBES filed Apr. 29, 2019, now U.S. Pat. No. 11,281,696 which is incorporated herein by reference for all purposes, which claims priority to U.S. Provisional Patent Application No. 62/664,429 entitled SYSTEMS AND METHODS FOR IMPROVING COMPUTATIONAL SPEED OF PLANNING BY TRACKING DEPENDENCIES IN HYPERCUBES filed Apr. 30, 2018 which is incorporated herein by reference for all purposes.

BACKGROUND OF THE INVENTION

Planning systems typically utilize a large multidimensional data space for representing complex systems or organizations. The data space can easily include billions of cells requiring calculations. Formulas for calculating cell values include references to other cell values, creating a complex network of references. Despite this high level of complexity, it is desirable for planning systems to be interactive tools that produce computation results very quickly, creating a problem when too many computations are required. Often, the time to perform all the computations required for the planning system is significant and too long for interactive use.

BRIEF DESCRIPTION OF THE DRAWINGS

Various embodiments of the invention are disclosed in the following detailed description and the accompanying drawings.

FIG. 4 is a diagram illustrating an embodiment of a first dependency pattern.

FIG. 5 is a diagram illustrating an embodiment of a second dependency pattern.

FIG. 6 is a diagram illustrating an embodiment of a third dependency pattern.

FIG. 7 is a diagram illustrating an embodiment of a fourth dependency pattern.

DETAILED DESCRIPTION

Figure 1:
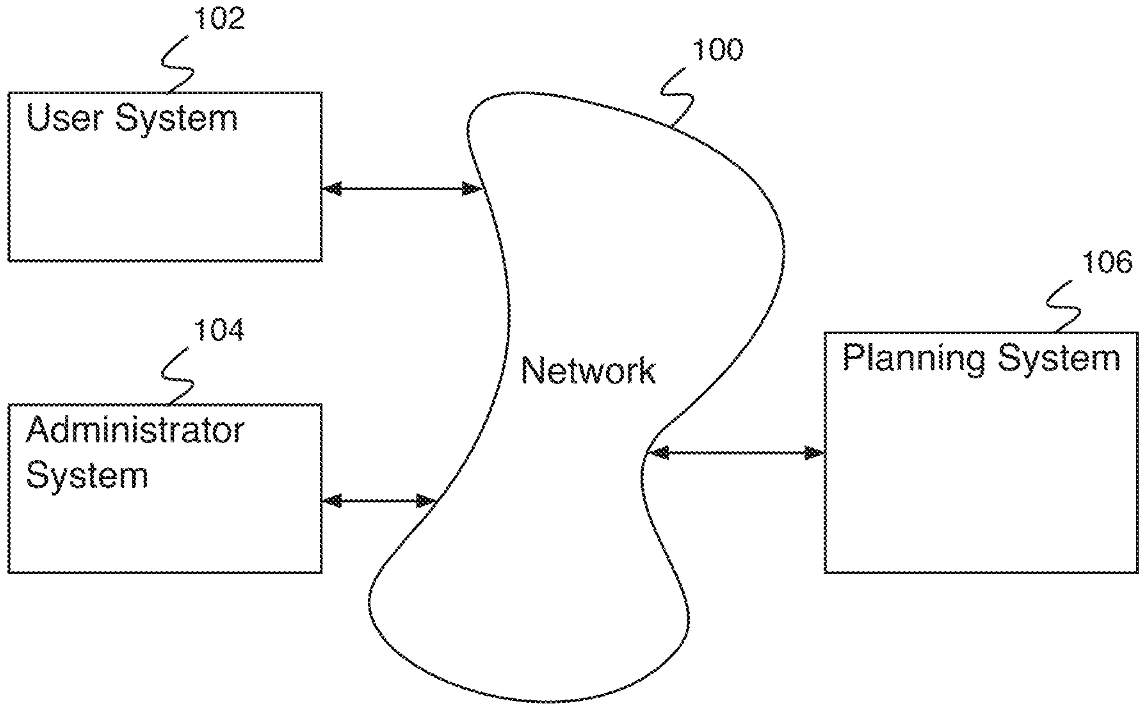
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for updating a hypercube comprises an interface configured to receive an indication to update a cell of the hypercube, and a processor configured to determine a primary dimension value associated with the cell, determine a group of dependencies based at least in part on the primary dimension value, wherein a dependency of the group of dependencies comprises one or more primary dimension values and a pattern, for the dependency of the group of dependencies, determine a set of source locations based at least in part on the one or more primary dimension values and the pattern, and mark the set of source locations as invalid.

A system for updating a hypercube comprises a system for increasing the performance of updating a planning system by increasing the performance of determining dependent cells in a planning hypercube. When a cell is updated in the hypercube, dependent cells (e.g., cells comprising formulas that depend on the updated cell) need to be updated as a result. Identifying the dependent cells for updating can be challenging. The system for updating a hypercube increases the performance of determining dependent cells by taking advantage of the patterns that exist in the hypercube. Cells depend on each other in predictable ways. The hypercube is arranged along a primary dimension—for example, a business account. When a cell associated with a primary dimension value (e.g., with a particular business account) is changed, it frequently affects cells associated with the same primary dimension value or with different primary dimension values according to one of a few typical patterns. For example, when a cell associated with a primary dimension value is changed, the value at a location associated with a different primary dimension value but all the same other dimension values is affected. Or, when a cell associated with a primary dimension value is changed, the value at locations associated with a different primary dimension value and the same organizational level value but different other dimension values are affected. The changes are stored sorted by pattern in structures referred to as dependencies. When a cell is changed, the associated primary dimension value is determined and mapped to a group of dependencies. Each dependency comprises a pattern and one or more primary dimension values it applies to. For a dependency of the group of dependencies, for each primary dimension value of the dependency, a set of cells is selected according to the pattern (e.g., the cell with all non-primary dimension values the same is selected, all cells with an organizational level dimension the same are selected, all cells are selected). The selected cells are marked as invalid. Cells are marked in this way for each dependency in the group of dependencies. The process is then repeated for each cell marked as invalid, in order to identify downstream affected cells. It continues to repeat until no more affected cells are determined. In some embodiments, performance is further improved by only marking cells as invalid in response to being computed. After the cells are marked invalid, the system goes through each of the marked invalid cells to update the state of the hypercube by recalculating the values of the marked invalid cells. In some embodiments, the system does not go through each of the invalid cells and recompute the invalid cells right away—the recomputation only happens the next time a user views these cells directly or indirectly (e.g., requiring the value of any given cell because the cell is referred to through formula or data aggregation from the cell being directly viewed).

In some embodiments, the planning system comprises a set of alternative plans—for example, plans for a bad year, an average year, and a good year; or plans including or not including a major acquisition. A set of alternative hypercubes is determined for the set of alternative plans. The set of alternative hypercubes comprises a set of formulas comprising a subset of structural formulas (e.g., formulas that are part of all hypercubes of the set of alternative hypercubes) and a subset of version-specific formulas (e.g., formulas that are part of a single hypercube of the set of alternative hypercubes). When the set of dependencies is created, some dependencies comprise structural dependencies (e.g., dependencies associated with the structural formulas) and some dependencies comprise version specific dependencies (e.g., dependencies associated with the version-specific formulas). When a cell of a hypercube associated with a particular alternative plan is updated, a set of dependencies associated with the plan is determined by determining a set of version-specific dependencies associated with the plan, determining the set of structural dependencies, and determining the union of the set of version-specific dependencies associated with the plan and the set of structural dependencies.

A further performance improvement can be gained by caching portions of the hypercube in order to ensure that all computations of a given sub-cube are able to be performed without access to a different sub-cube. Sub-cubes are typically stored on different data storage devices, increasing access times when a computation has to access a different sub-cube.

The system improves the computer by speeding data updates through the use of pattern-based dependency tracking. Dependencies are stored in a compact structure enabling rapid access to dependent cells when updating a cell of the hypercube. Without a data structure for dependency tracking, the entire hypercube must be searched for dependencies, greatly slowing performance. A simple data structure, wherein the dependencies for each cell are directly stored, adds a great deal of overhead in a hypercube potentially containing billions of cells. The pattern-based dependency tracking improves speed without increasing overhead, taking advantage of the regular nature of the planning system hypercube structure.

FIG. 1 is a block diagram illustrating an embodiment of a network system. In some embodiments, the network system of FIG. 1 comprises a network system for a planning system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, and planning system 106 communicate via network 100.

User system 102 comprises a user system for use by a user. A user uses a user system to interact with planning system 106—for example, to store planning data, to request planning data, to request reporting based on planning data, to evaluate planning calculations, etc. In some embodiments, the network system of FIG. 1 comprises a plurality of user systems associated with one or more users. Administrator system 104 comprises an administrator system for use by an administrator. Administrator system 104 comprises an administrator system for executing administrator commands, for configuring planning system 106, etc.

Planning system 106 comprises a planning system for organizational planning. For example, planning system 106 comprises data and computations arranged in a grid form. Planning system 106 comprises a plurality of dimensions for data organization (e.g., planning system 106 comprises a hypercube). In some embodiments, updating of a hypercube or a portion of a hypercube of planning system 106 is sped up using pattern-based dependency tracking. For example, planning system 106 comprises a system for updating a hypercube, comprising an interface configured to receive an indication to update a cell of the hypercube, and a processor configured to determine a primary dimension value associated with the cell, determine a group of dependencies based at least in part on the primary dimension value, wherein a dependency of the group of dependencies comprises one or more primary dimension values and a pattern, for the dependency of the group of dependencies, determine a set of source locations based at least in part on the one or more primary dimension values and the pattern, and mark the set of source locations as invalid.

Figure 2:
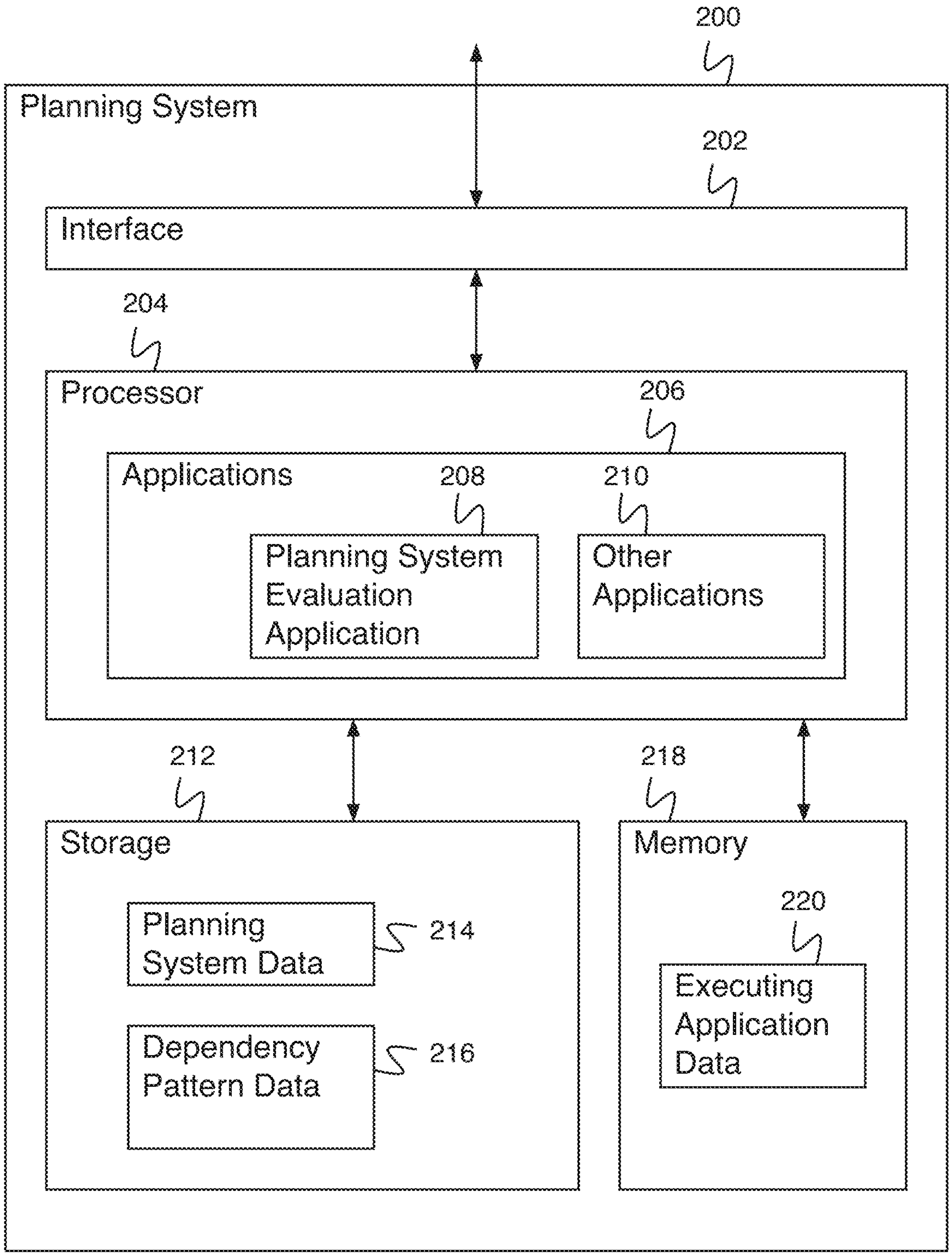
FIG. 2 is a block diagram illustrating an embodiment of a planning system.

FIG. 2 is a block diagram illustrating an embodiment of a planning system. In some embodiments, planning system 200 of FIG. 2 comprises planning system 106 of FIG. 1. In the example shown, planning system 200 comprises interface 202. Interface 202 comprises an interface for communicating with external systems using a network. For example, interface 202 comprises an interface for communicating with a user system (e.g., for receiving planning data, for receiving a formula definition, for receiving a request to update a planning system, etc.). Processor 204 comprises a processor for executing applications 206. Applications 206 comprise planning system evaluation application 208 and other applications 210. For example, planning system evaluation application 208 receives an indication to update a cell of the hypercube, determines a primary dimension value associated with the cell, determines a group of dependencies based at least in part on the primary dimension value, wherein a dependency of the group of dependencies comprises one or more primary dimension values and a pattern, for the dependency of the group of dependencies, determines a set of source locations based at least in part on the one or more primary dimension values and the pattern, and marks the set of source locations as invalid. After the source locations are marked, the system updates the marked cells (e.g., by recalculating the value of the cells) to update the state of the hypercube. Other applications 210 comprises any other appropriate applications (e.g., a communications application, a chat application, a web browser application, a document preparation application, a data storage and retrieval application, a user interface application, a data analysis application, etc.). Planning system 200 additionally comprises storage 212. Storage 212 comprises planning system data 214 (e.g., comprising historical data, projected data, formula data, etc.) and dependency pattern 216 (e.g., dependency pattern data comprising patterns indicating relationships of dependencies within planning system data). Tenant security control system 200 additionally comprises memory 218. Memory 218 comprises executing application data 220 comprising data associated with applications 206.

In some embodiments, all computation and invalidation happen in memory. In those cases, the system brings stored data (e.g., planning system data and dependency pattern data) from storage 212 (e.g., from planning system data 214 and dependency pattern data 216) to memory 218 and builds data structures to store them in memory 218, so that the system performs the computations at optimal speed since everything is in memory.

In some embodiments, dependency pattern data is not stored in storage 212, but instead is generated on the fly from planning system data 214 after or while being loaded into memory 218. The generation of planning system data is based on formulas stored as part of the planning system data 214.

Figure 3:
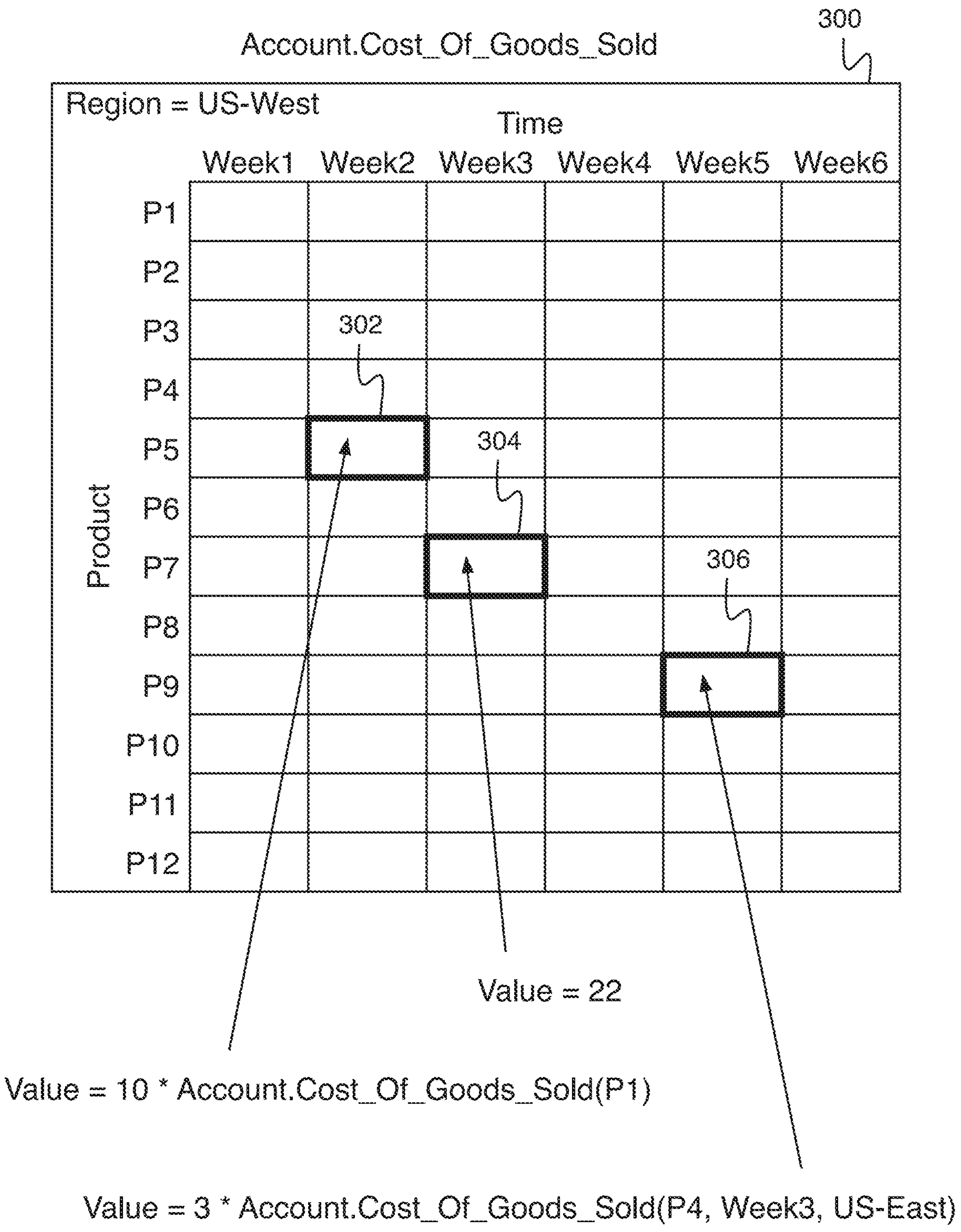
FIG. 3 is a diagram illustrating an embodiment of a portion of planning system data.

FIG. 3 is a diagram illustrating an embodiment of a portion of planning system data. In some embodiments, planning system data 300 is stored in planning system data 214 of FIG. 2. In the example shown, planning system data 300 comprises a plurality of cells. The location of each cell is associated with values of each of a set of dimensions. For example, cell 302 is associated with Product=P5 and Time=Week2. All cells shown in planning system data 300 are associated with Region=US-West and Account=Cost_Of_Goods_Sold. Other portions of planning system data that are not shown are associated with other values for Region or Account. For example, planning system data 300 comprises a portion of a hypercube.

Cells of planning system data 300 store either a formula or a number. For example, cell 304 comprises the value of the number 22. Cell 306 comprises the formula Value=3*Account.Cost_Of_Goods_Sold (P4, Week3, US-East). The portion of the formula "Account. Cost_Of_Goods_Sold (P4, Week3, US-East)" comprises a reference to the value stored in the cell associated with Account=Cost_Of_Goods_Sold, Region=US-East, Product=P4, and Time=Week3. The reference comprises a term. Cell 302 comprises the formula Value=10*Account.Cost_Of_Goods_Sold (P1). The term of the formula of cell 302 indicates Account=Cost_Of_Goods_Sold and Product=P1, however, other dimensions are not indicated in the term. The other dimensions are inherited from the scope of the cell. For example, the term of the formula of cell 302 inherits Region=US-West and Time=Week2. For example, using inheritance, the same formula can have different values if it is stored in different locations.

FIG. 4 is a diagram illustrating an embodiment of a first dependency pattern. In some embodiments, the dependency pattern shown in FIG. 4 is stored in memory 218 of FIG. 2 during execution. In some embodiments, the dependency pattern is determined from planning system data 214 of FIG. 2 or retrieved from dependency pattern data 216 of FIG. 2. In the example shown, slice of SALE 400 of a hypercube is shown. In this example, the hypercube has 4 levels L1, L2, L3, L4 and many other dimensions including Customer and SKU (not shown). The Customer dimension has two values: ATT and Comcast. The SKU dimension has two values: Home_Service and Cable_Internet. Account is the primary dimension. The syntax to represent a regular account is ACCT.SubCubeName.AcctName. The syntax to represent a global account is ASSUM.AcctName. Global account is a special type of account to store constant values across any dimensional slices in the hypercube except for time—a global account can vary across time. SALE is a subcube in the hypercube. SALE has two dimensions: Customer and SKU. SALE has six accounts:

```
1) ACCT.SALE.Quantity;
2) ACCT.SALE.AvgSellingPrice;
3) ACCT.SALE.Revenue = ACCT.SALE.Quantity * ACCT.SALE.AvgSellingPrice;
4) ACCT.SALE.Comission = ACCT.SALE.Revenue * ACCT.GL.Commision;
5) ACCT.SALE.Freight = ACCT.SALE.Quantity * ASSUM.FreightRate;
6) ACCT.SALE.Direct__Cost = ACCT.SALE.Quantity
        ACCT.COST.StandardCost/Unit[level=L4]
```

COST is a subcube in this hypercube. COST has dimensions: SKU, level, and time. Cost has an account: ACCT.COST.StandardCost/Unit. Slice of COST 402 of a hypercube is shown. GL is a subcude of in this hypercube. GL subcube has no dimension other than a level dimension and a time dimension. GL shows commission account. Slice of GL 404 of a hypercube is shown. Global account has account FreightRate. Global account 406 of a hypercube is shown.

Pattern 1 dependency comprises a SameRow dependency. Note for this dependency the dependents are in the same subcube and all dimension values and level are inherited. For the formula at ACCT.SALE.Revenue shows that ACCT.SALE.Revenue=ACCT.SALE.Quantity*ACCT.SALE.AvgSellingPrice. If account SALE.Quantity 408 is changed for (L1, ATT, Home_Service, Week2), then SALE.Revenue 410 at (L1, ATT, Home_Service, Week2) is marked as invalid (e.g., a flag is set for the cell as "Not_Computed"). Similarly, if account SALE.Quantity is changed for (L1, ATT, Home_Service, Week1), then SALE.Revenue at (L1, ATT, Home_Service, Week1) is marked as invalid (e.g., a flag is set for the cell as "Not_Computed") or any other week for that matter. Other previously computed values of SALE.REVENUE at other slices such as: (L2, ATT, Home_Servce) or (L1, Comcast, Home_Service) are not changed.

FIG. 5 is a diagram illustrating an embodiment of a second dependency pattern. In some embodiments, the dependency pattern shown in FIG. 5 is stored in memory 218 of FIG. 2 during execution. In some embodiments, the dependency pattern is determined from planning system data 214 of FIG. 2 or retrieved from dependency pattern data 216 of FIG. 2. In the example shown, slice of SALE 500 of a hypercube is shown. In this example, the hypercube has 4 levels L1, L2, L3, L4 and many other dimensions including Customer and SKU (not shown). The Customer dimension has two values: ATT and Comcast. The SKU dimension has two values: Home_Service and Cable_Internet. Account is the primary dimension. The syntax to represent a regular account is ACCT.SubCubeName.AcctName. The syntax to represent a global account is ASSUM.AcctName. Global account is a special type of account to store constant values across any dimensional slices in the hypercube. SALE is a subcube in the hypercube. SALE has two dimensions: 2Customer and SKU. SALE has six accounts:

```
1) ACCT.SALE.Quantity;
2) ACCT.SALE.AvgSellingPrice;
3) ACCT.SALE.Revenue = ACCT.SALE.Quantity * ACCT.SALE.AvgSellingPrice;
4) ACCT.SALE.Comission = ACCT.SALE.Revenue * ACCT.GL.Commision;
5) ACCT.SALE.Freight = ACCT.SALE.Quantity * ASSUM.FreightRate;
6) ACCT.SALE.Direct__Cost = ACCT.SALE.Quantity *
                    ACCT.COST.StandardCost/Unit[level=L4]
```

COST is a subcube in this hypercube. COST has dimensions: SKU, Level, and time. Cost has one account: ACCT.COST.StandardCost/Unit. Slice of COST 502 of a hypercube is shown. GL is a subcude of in this hypercube. GL subcube has no dimension other than a level dimension and a time dimension. GL shows commission account. Slice of GL 504 of a hypercube is shown. Global account has account FreightRate. Global account 506 of a hypercube is shown.

Pattern 2 dependency comprises a SameLevel dependency. Note for this dependency the dependents are in different subcubes and the level is inherited. For the formula at ACCT.SALE.Commission shows that ACCT.SALE.Commission=ACCT.SALE.Revenue*ACCT.GL.Commission. If account GL.Commission 508 is changed for (L1, Week2), then all SALE.Commission at Level L1 is marked as invalid (e.g., a flag is set for the cell as "Not_Computed"). This includes: (L1, ATT, Home_Service), (L1, ATT, Cable_Internet), (L1, Comcast, Home_Service), (L1, Comcast, Cable_Internet). If account GL.Commission 508 is changed for (L1, Week1), then all SALE.Commission 510 at Level L1 is marked as invalid (e.g., a flag is set for the cell as "Not_Computed"). In some embodiments, in response to a single time period change (e.g. a single week), the system invalidates all the weeks. Other previously computed values of SALE.Commission at any slices that contain level L2, L3, and L4 are unchanged.

FIG. 6 is a diagram illustrating an embodiment of a third dependency pattern. In some embodiments, the dependency pattern shown in FIG. 6 is stored in memory 218 of FIG. 2 during execution. In some embodiments, the dependency pattern is determined from planning system data 214 of FIG. 2 or retrieved from dependency pattern data 216 of FIG. 2. In the example shown, slice of SALE 600 of a hypercube is shown. In this example, the hypercube has 4 levels L1, L2, L3, L4 and many other dimensions including Customer and SKU (not shown). The Customer dimension has two values: ATT and Comcast. The SKU dimension has two values: Home_Service and Cable_Internet. Account is the primary dimension. The syntax to represent a regular account is ACCT.SubCubeName.AcctName. The syntax to represent a global account is ASSUM.AcctName. Global account is a special type of account to store constant values across any dimensional slices in the hypercube. SALE is a subcube in the hypercube. SALE has two dimensions: Customer and SKU. SALE has six accounts:

```
1) ACCT.SALE.Quantity;
2) ACCT.SALE.AvgSellingPrice;
3) ACCT.SALE.Revenue = ACCT.SALE.Quantity * ACCT.SALE.AvgSellingPrice;
4) ACCT.SALE.Comission = ACCT.SALE.Revenue * ACCT.GL.Commision;
5) ACCT.SALE.Freight = ACCT.SALE.Quantity * ASSUM.FreightRate;
6) ACCT.SALE.Direct_Cost = ACCT.SALE.Quantity *
        ACCT.COST.StandardCost/Unit[level=L4]
```

COST is a subcube in this hypercube. COST has dimensions: SKU, Level, and time. Cost has one account: ACCT.COST.StandardCost/Unit. Slice of COST 602 of a hypercube is shown. GL is a subcude of in this hypercube. GL subcube has no dimension other than Level and time. GL shows commission account. Slice of GL 604 of a hypercube is shown. Global account has account FreightRate. Global account 606 of a hypercube is shown.

Pattern 3 dependency comprises a Global dependency. For the formula at ACCT.SALE.Freight shows that ACCT.SALE.Freight=ACCT.SALE.Quantity*ASSUM.FreightRate. If FreightRate 608 is changed for (Week2), then all SALE.Freight is marked as invalid (e.g., a flag is set for the cell as "Not_Computed") in all slices (e.g., for each of the 4 levels*2 customers*2 SKUs=16 total slices). This includes SALE.Freight 610 at (L1, ATT, Home_Service), (L1, ATT, Cable_Internet), (L1, Comcast, Home_Service), (L1, Comcast, Cable_Internet) as well as all the other permutations for L2, L3, L4, ATT, Comcast, Home_Service, and Cable_Internet.

FIG. 7 is a diagram illustrating an embodiment of a fourth dependency pattern. In some embodiments, the dependency pattern shown in FIG. 6 is stored in memory 218 of FIG. 2 during execution. In some embodiments, the dependency pattern is determined from planning system data 214 of FIG. 2 or retrieved from dependency pattern data 216 of FIG. 2. In the example shown, slice of SALE 700 of a hypercube is shown. In this example, the hypercube has 4 levels L1, L2, L3, L4 and many other dimensions including Customer and SKU (not shown). The Customer dimension has two values: ATT and Comcast. The SKU dimension has two values: Home_Service and Cable_Internet. Account is the primary dimension. The syntax to represent a regular account is ACCT.SubCubeName.AcctName. The syntax to represent a global account is ASSUM.AcctName. Global account is a special type of account to store constant values across any dimensional slices in the hypercube. SALE is a subcube in the hypercube. SALE has two dimensions: Customer and SKU. SALE has six accounts:

```
1) ACCT.SALE.Quantity;
2) ACCT.SALE.AvgSellingPrice;
3) ACCT.SALE.Revenue = ACCT.SALE.Quantity * ACCT.SALE.AvgSellingPrice;
4) ACCT.SALE.Comission = ACCT.SALE.Revenue * ACCT.GL.Commision;
5) ACCT.SALE.Freight = ACCT.SALE.Quantity * ASSUM.FreightRate;
6) ACCT.SALE.Direct_Cost = ACCT.SALE.Quantity *
        ACCT.COST.StandardCost/Unit[level=L4]
```

COST is a subcube in this hypercube. COST has dimensions: SKU, Level, and time. Cost has one account: ACCT.COST.StandardCost/Unit. Slice of COST 702 of a hypercube is shown. GL is a subcude of in this hypercube. GL subcube has no dimension other than Level and time. GL shows commission account. Slice of GL 704 of a hypercube is shown. Global account has account FreightRate. Global account 706 of a hypercube is shown.

Pattern 4 dependency comprises a dependency associated with qualifiers. For the formula at ACCT.SALE.Direct_Cost shows that ACCT.SALE.Direct_Cost=ACCT. SALE. Quantity*ACCT.COST.StandardCost/Unit[level=L4]. If StandardCost/Unit 708 is changed for (LA, Week2), then all SALE.Direct_Cost is marked as invalid (e.g., a flag is set for the cell as "Not_Computed") in all slices (e.g., for each of the 4 levels*2 customers*1 SKU=8 total slices)

Figure 8:
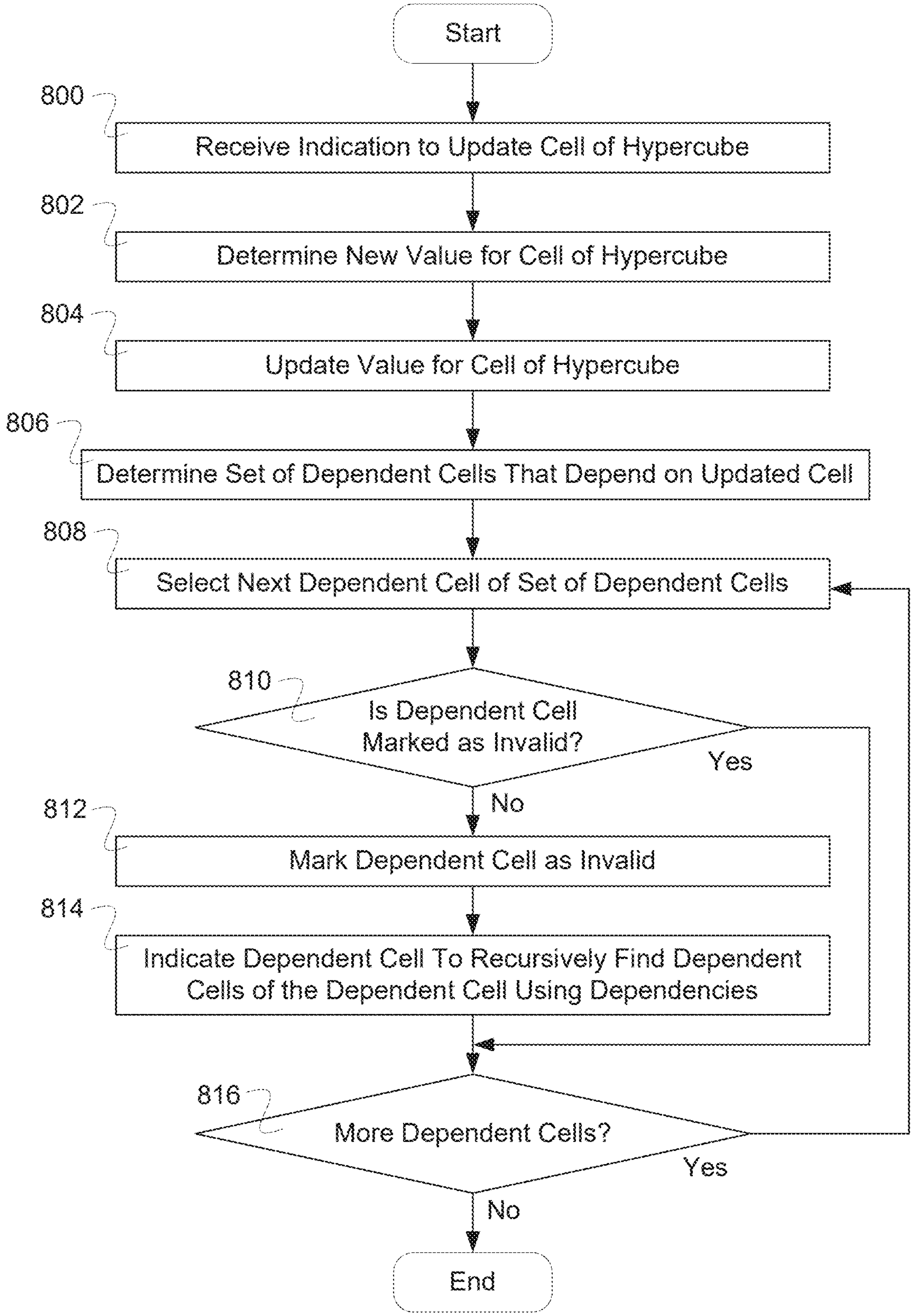
FIG. 8 is a flow diagram illustrating an embodiment of a process for updating a hypercube.

FIG. 8 is a flow diagram illustrating an embodiment of a process for updating a hypercube. In some embodiments, the process of FIG. 8 is executed by planning system 106 of FIG. 1. In the example shown, in 800, an indication to update a cell of a hypercube is received. For example, the indication comprises a new value or a new formula for the cell. In 802, a new value is determined for the cell of the hypercube. For example, a new value is determined for the cell of the hypercube by evaluating the new value or the new formula. In 804, the value for the cell of the hypercube is updated. For example, the new value is stored in the hypercube data structure. In 806, a set of dependent cells that depend on the cell is determined. For example, a set of dependent cells that depend on the cell is determined using pattern-based dependency tracking. In 808, a next dependent cell of the set of dependent cells is selected. In some embodiments, the next dependent cell comprises the first dependent cell. In 810, it is determined the dependent cell is marked as invalid. For example, a cell may have been marked as invalid by a previous change in the hypercube. In response to determining that the dependent cell is not marked as invalid, in 812 the dependent cell is marked as invalid. For example, the cell is marked (e.g., using a flag—for example, 'not computed' flag—associated with the dependent cell) as invalid indicating that it has not been updated based on being dependent from a cell that has been updated, and upon viewing or being required to view another cell is updated to a new value by recomputing the value (e.g., reevaluating a formula in the cell). In 814, the dependent cell is indicated to recursively find dependent cells of the dependent cell using dependencies. For example, each one of the newly marked dependent cells is used as a starting point (e.g., like a user modified cell) to find dependent cells for that new starting point using the dependency patterns. In some embodiments, a separate process is spawned similar to the process of this figure using the dependent cell as the updated cell of the hypercube. In 816, it is determined whether there are more dependent cells. In response to being determined that there are more dependent cells, control passes to 808. In response to being determined that there are not more dependent cells, the process ends. In response to determining that the dependent cell is marked as invalid in 810, control passes to 816.

Figure 9:
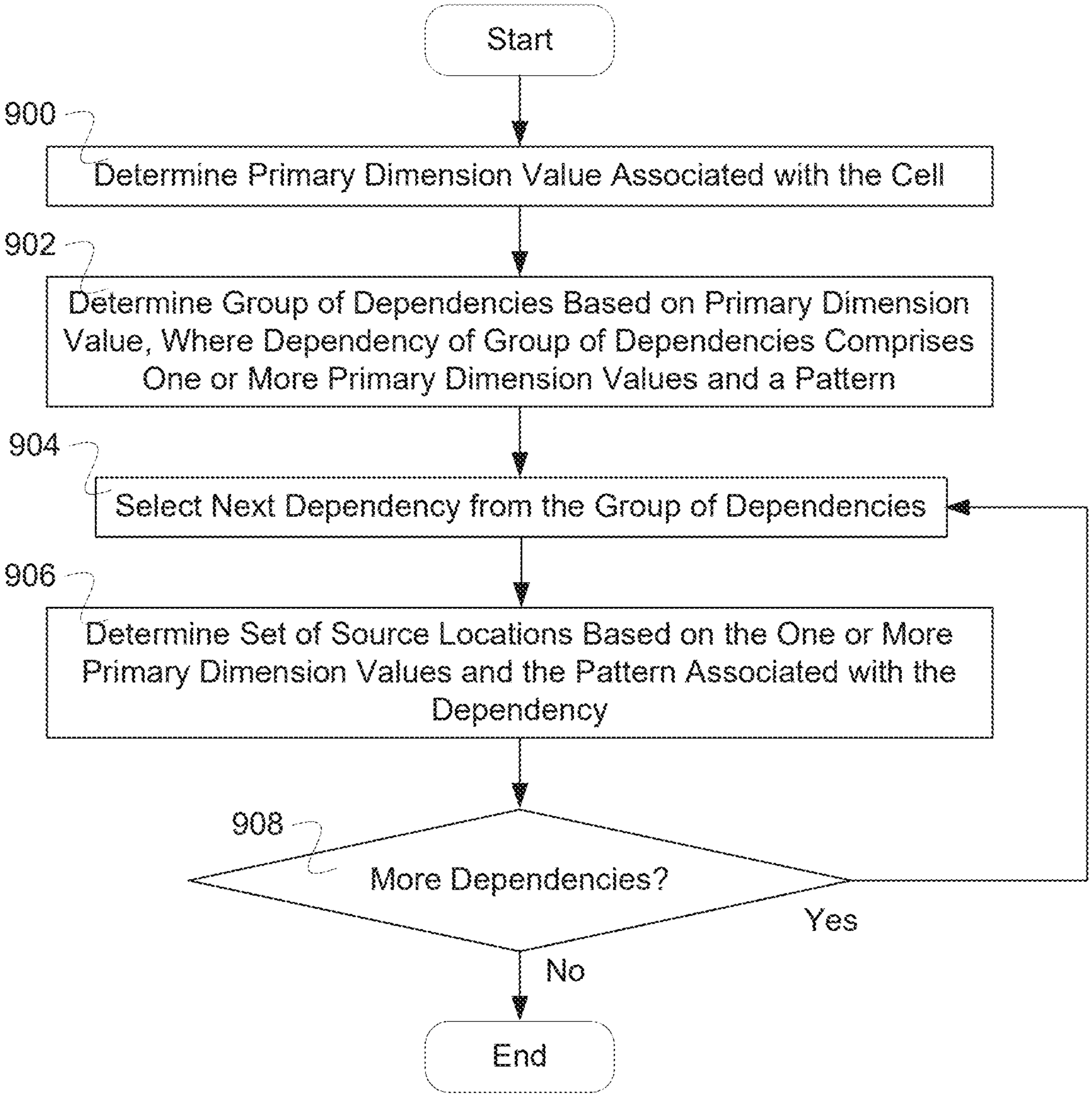
FIG. 9 is a flow diagram illustrating an embodiment of a process for determining a set of dependent cells that depend on a cell.

FIG. 9 is a flow diagram illustrating an embodiment of a process for determining a set of dependent cells that depend on a cell. In some embodiments, the process of FIG. 9 implements 806 of FIG. 8. In the example shown, in 900, a primary dimension value associated with the cell is determined. In some embodiments, determining a primary dimension value associated with the cell comprises determining a primary dimension associated with the cell (e.g., determining which dimension of the dimensions of the hypercube comprises the primary dimension); determining a set of primary dimension values associated with the primary dimension (e.g., determining the set of all possible primary dimension values associated with the primary dimension); and determining a primary dimension value of the set of primary dimension values associated with the cell. In 902, a group of dependencies is determined based at least in part on the primary dimension value, wherein a dependency of the group of dependencies comprises one or more primary dimension values and the pattern. In 904, a next dependency is selected from the group of dependencies. For example, a first dependency or a subsequent dependency is selected in the group of dependencies. In 906, a set of source locations is determined based at least in part on the one or more primary dimension values and the pattern associated with the dependency. For example, the set of source locations is determined by aggregating source locations identified using the pattern as indicated by the dimension values. In 908, it is determined whether there are more dependencies. In response to there being more dependencies, control passes to 904. In response to there not being more dependencies, the process ends.

Figure 10:
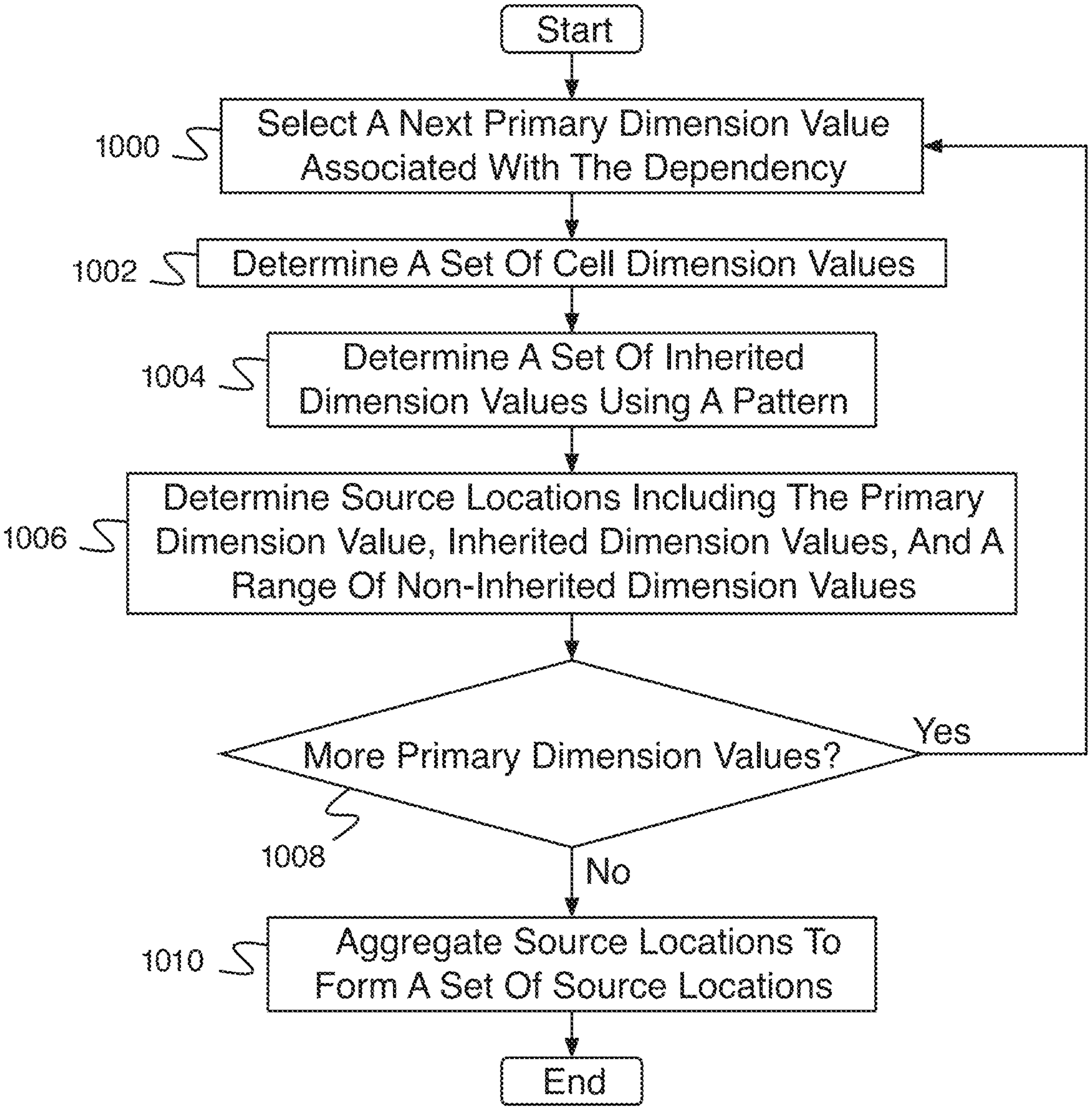
FIG. 10 is a flow diagram, illustrating an embodiment of a process for determining a set of source locations for a dependency.

FIG. 10 is a flow diagram, illustrating an embodiment of a process for determining a set of source locations for a dependency. In some embodiments, the process of FIG. 10 implements 906 of FIG. 9. In the example shown, in 1000, a next primary dimension value associated with the dependency is selected. In some embodiments, the next primary dimension value comprises the first primary dimension value. In 1002, a set of cell dimension values is determined. For example, the set of cell dimension values comprises a set of dimension values associated with the cell (e.g., the position in the hypercube of the updated cell). In 1004, a set of inherited dimension values is determined using a pattern. For example, all non-primary dimensions are inherited, a level dimension is inherited, no dimension values are inherited, a set of dimension values are specified by qualifiers, etc. In 1006, source locations including the primary dimension value, inherited dimension values, and a range of non-inherited dimension values. For example, inherited dimension values comprise any dimension values not inherited in 1004. Or, for example, a range of non-inherited dimension values comprises any dimension value not inherited in 1004 are included across their full range. In 1008, it is determined whether there are more primary dimension values. In response to being determined that there are more primary dimension values, control passes to 1000. In response to being determined that there are not more primary dimension values, control passes to 1010. In 1010, source locations are aggregated to form a set of source locations. For example, the set of source locations comprises an aggregation of the source locations that are identified using the pattern.

Figure 11:
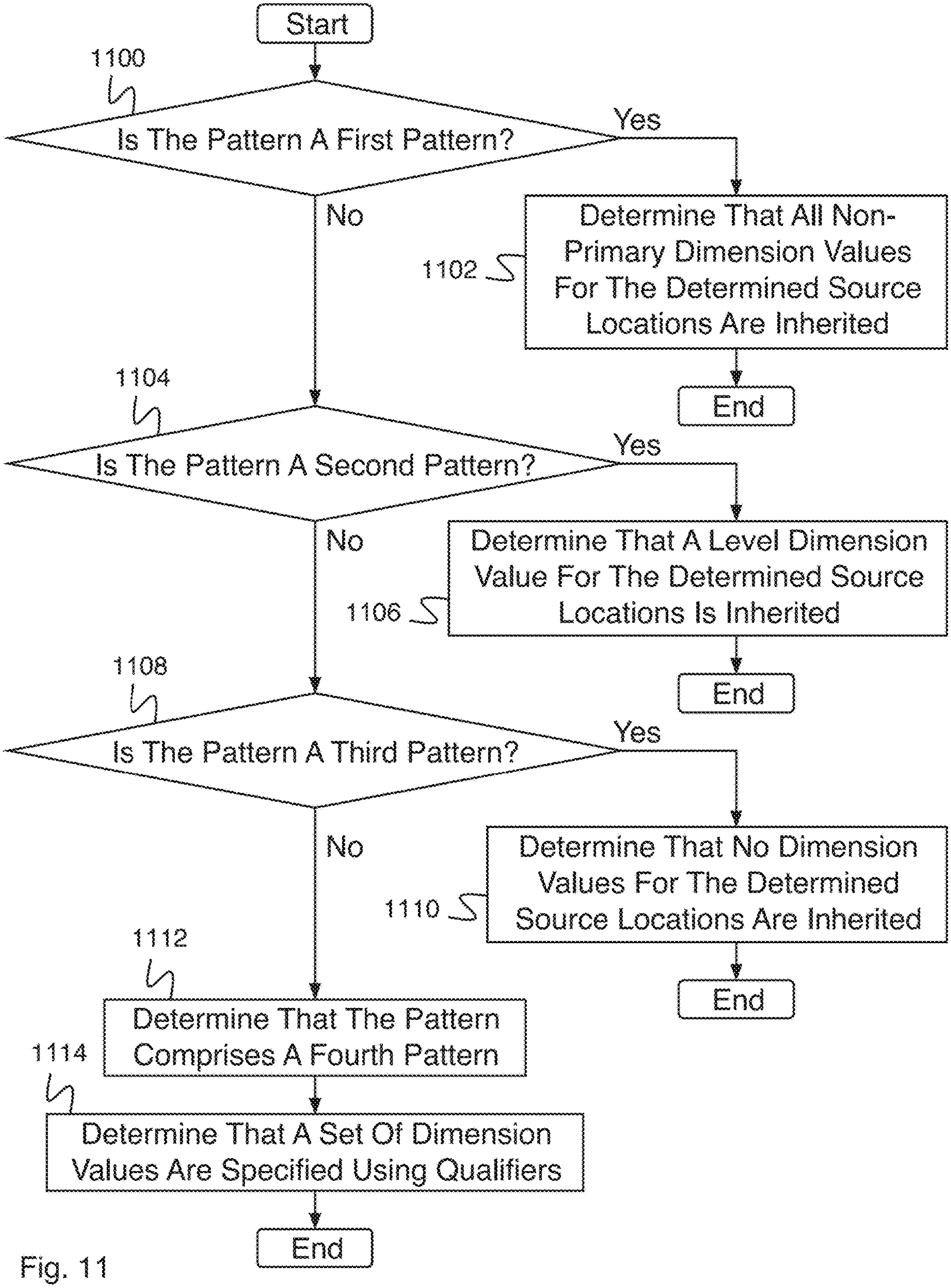
FIG. 11 is a flow diagram illustrating an embodiment of a process for determining a set of inherited dimension values.

FIG. 11 is a flow diagram illustrating an embodiment of a process for determining a set of inherited dimension values. In some embodiments, the process of FIG. 11 implements 1004 of FIG. 10. In the example shown, in 1100, it is determined whether the pattern is a first pattern. In response to being determined in 1100 that the pattern is a first pattern, control passes to 1102. In 1102, it is determined that all non-primary dimension values for the determined source locations are inherited, and the process ends. In response to being determined in 1100 that the pattern is not a first pattern, control passes to 1104. In 1104, it is determined whether the pattern is a second pattern. In response to being determined that the pattern is a second pattern, control passes to 1106. In 1106, it is determined that a level dimension value for the determined source location is inherited, and the process ends. In response to being determined in 1104 that the pattern is not a second pattern, control passes to 1108. In 1108, it is determined whether the pattern is a third pattern. In response to being determined that the pattern is a third pattern, control passes to 1110. In 1110, it is determined that no dimension values for the determined source locations are inherited, and the process ends. In response to being determined in 1108 that the pattern is not a third pattern, control passes to 1112. In 1112, it is determined that the pattern comprises a fourth pattern. In 1114, it is determined that a set of dimension values are specified using qualifiers. For example, the qualifiers are stored associated with the cell.

Figure 12:
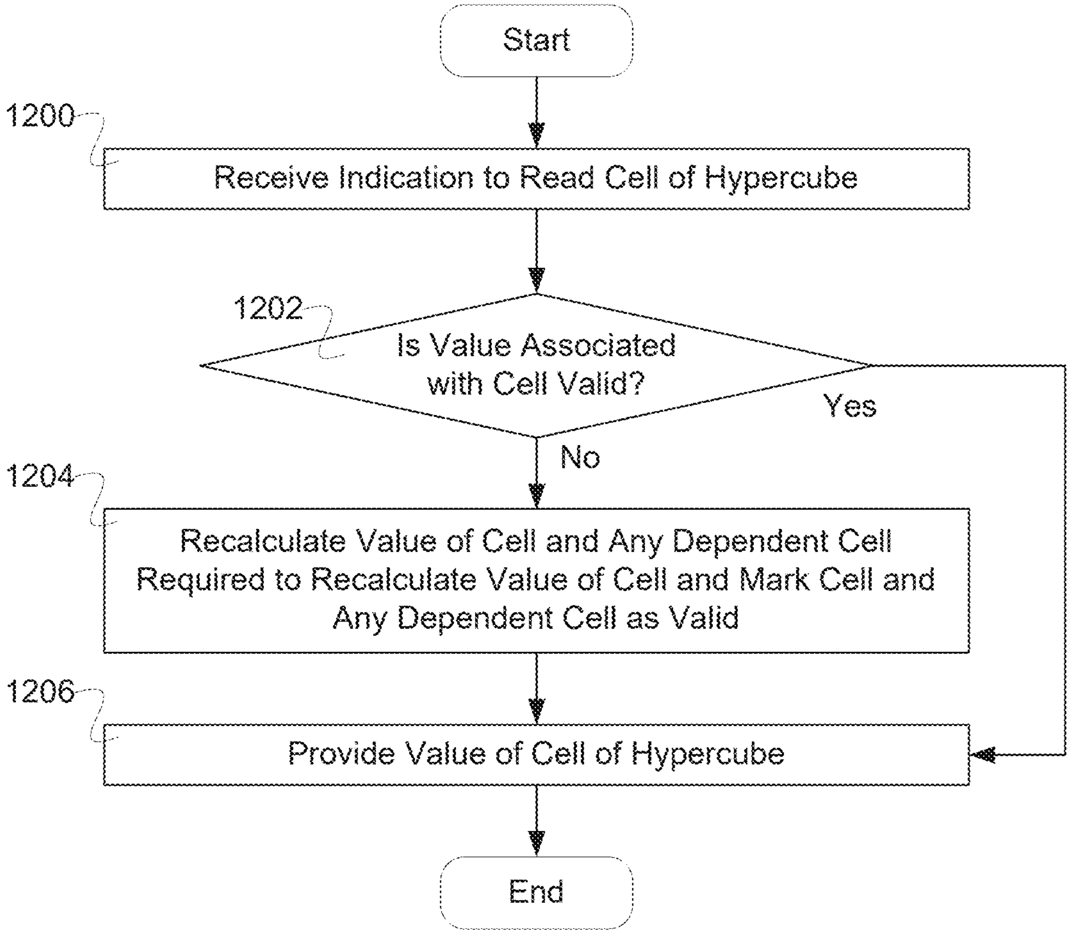
FIG. 12 is a flow diagram illustrating an embodiment of a process for evaluating a cell value.

FIG. 12 is a flow diagram illustrating an embodiment of a process for evaluating a cell value. In some embodiments, the process of FIG. 12 is executed by planning system 106 of FIG. 1. In the example shown, in 1200 an indication is received to read cell of hypercube. For example, a user indicates a desire to view or retrieve a value of a cell. In 1202, it is determined whether the value associated with the cell is valid. For example, the cell value is determined to be valid by checking a status or a flag associated with the cell (e.g., a flag indicating 'not computed' or 'not valid' or 'valid' etc.). In response to determining that the value associated with the cell is valid, control passes to 1206. In response to determining that the value associated with the cell is not valid, then in 1204 the value of the cell and any dependent cell required to recalculate the value of the cell are recalculated, and the cell as well as any dependent cell are marked as valid. For example, the value of the cell is evaluated based on the formula of the cell, and while tracing down any required values of the formula, any dependent cell is also calculated. After calculating the cell, the cell is marked as valid. In 1206, the value of the cell of the hypercube is provided.

Figure 13:
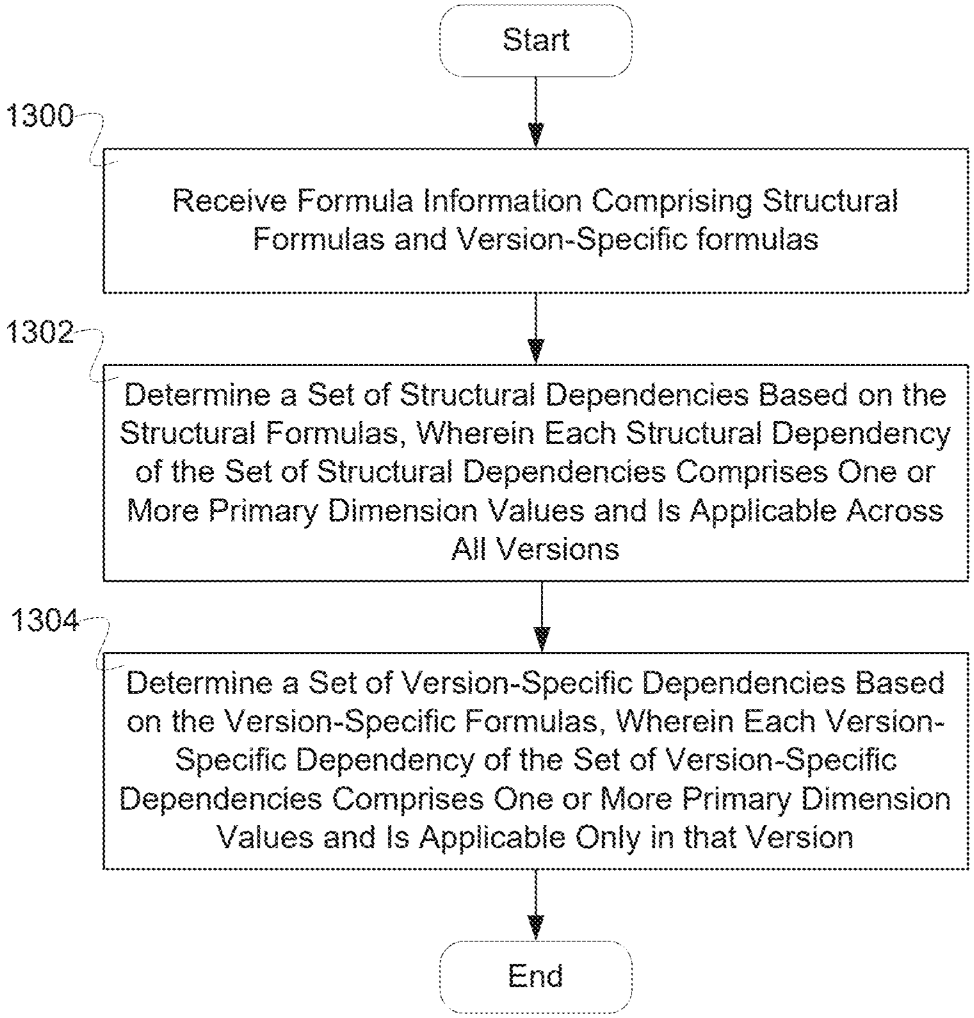
FIG. 13 is a flow diagram illustrating and embodiment of a process for determining structural dependencies and version-specific dependencies.
Figure 14:
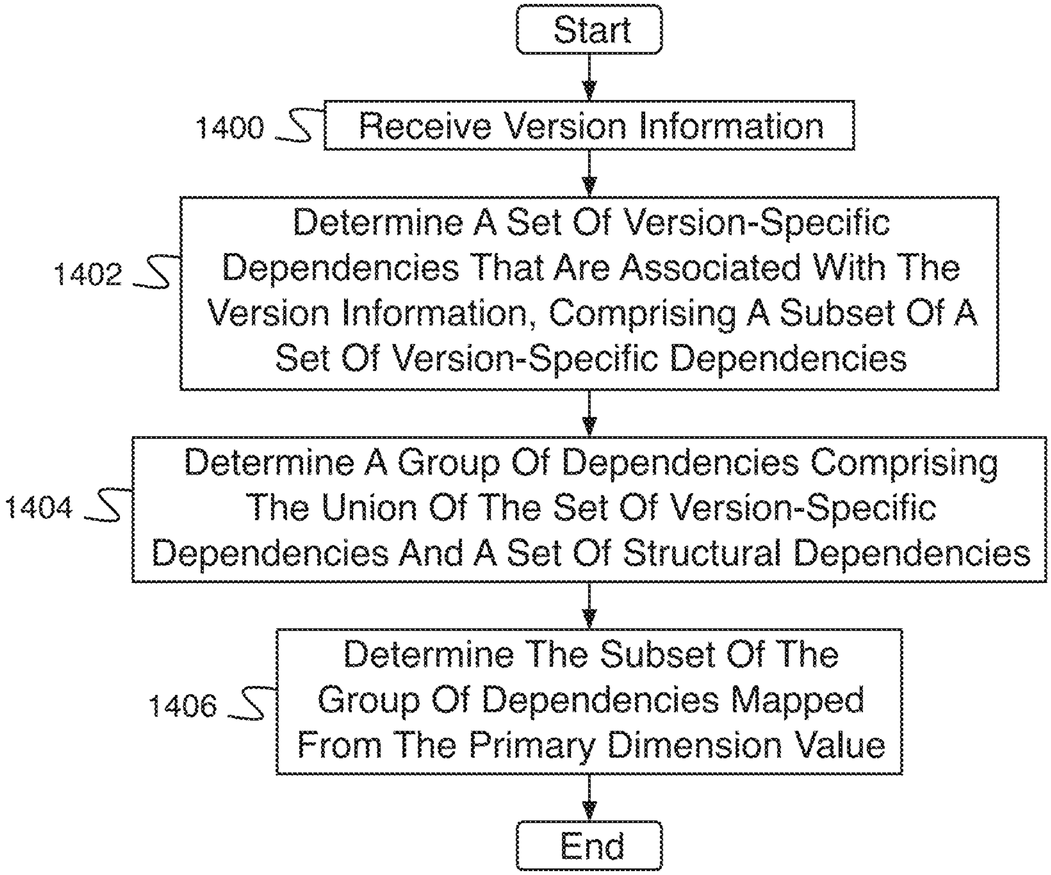
FIG. 14 is a flow diagram illustrating an embodiment of a process for determining a group of dependencies for a given primary dimension in a version.

FIG. 13 is a flow diagram illustrating and embodiment of a process for determining structural dependencies and version-specific dependencies. In some embodiments, the process of FIG. 13 is executed by planning system 106 of FIG. 1 for preparing a multiple version plan. In the example shown, in 1300, formula information comprising structural formulas and version-specific formulas is received. In 1302, a set of structural dependencies is determined based on the structural formulas, wherein each structural dependency of the set of structural dependencies comprises one or more primary dimension values and is applicable across ALL versions. In 1304, a set of version-specific dependencies is determined based on the version-specific formulas, wherein each version-specific dependency of the set of version-specific dependencies comprises one or more primary dimension values and is applicable only in that version FIG. 14 is a flow diagram illustrating an embodiment of a process for determining a group of dependencies for a given primary dimension in a version. In some embodiments, the process of FIG. 14 implements 902 of FIG. 9 in response to the planning system comprising a multiple version plan. In the example shown, in 1400, version information is received. For example, version information indicates which plan version is used. In 1402, a set of version-specific dependencies that are associated with the version information is determined, comprising a subset of a set of version-specific dependencies. In 1404, a group of dependencies comprising the union of the set of version-specific dependencies and a set of structural dependencies is determined. In 1406, the subset of the group of dependencies mapped from the primary dimension value is determined.

Figure 15:
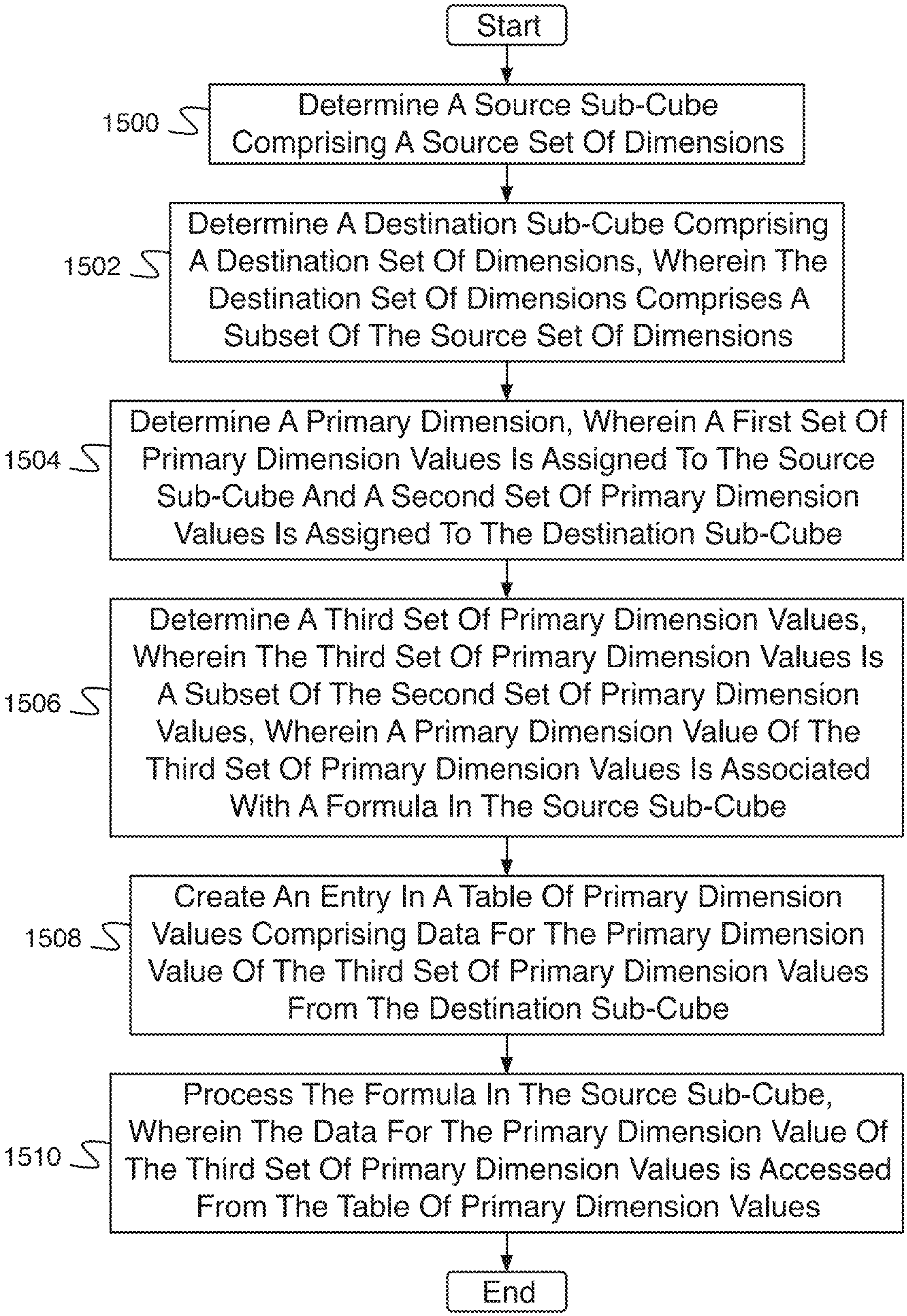
FIG. 15 is a flow diagram illustrating an embodiment of a process for processing a formula in a source sub-cube.

FIG. 15 is a flow diagram illustrating an embodiment of a process for processing a formula in a source sub-cube. In some embodiments, the process of FIG. 15 is executed by planning system 106 of FIG. 1 for efficiently processing a formula. In the example shown, in 1500, a source sub-cube comprising a source set of dimensions is determined. In 1502, a destination sub-cube comprising a destination set of dimensions is determined, wherein the destination set of dimensions comprises a subset of the source set of dimensions. In 1504, a primary dimension is determined, wherein a first set of primary dimension values is assigned to the source sub-cube and a second set of primary dimension values is assigned to the destination sub-cube. In 1506, a third set of primary dimension values is determined, wherein the third set of primary dimension values is a subset of the second set of primary dimension values, wherein a primary dimension value of the third set of primary dimension values is associated with a formula in the source sub-cube. In 1508, an entry in a table of primary dimension values is created, comprising data for the primary dimension value of the third set of primary dimension values from the destination sub-cube. For example, the source sub-cube data structure is mapped to the destination sub-cube data structure, enabling faster access to data between the source sub-cube and the destination sub-cube. In 1510, the formula is processed in the source sub-cube, wherein the data for the primary dimension value of the third set of primary dimension values is accessed from the table of primary dimension values.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for updating a hypercube, comprising:

an interface configured to:

receive an indication to update a cell of the hypercube;

a hardware processor; and a memory coupled with the processor, wherein the memory is configured to provide the hardware processor with instructions which when executed cause the hardware processor to:

update a portion of the hypercube, comprising:

updating the cell of the hypercube;

determining a set of dependent cells that depend on the cell using pattern-based dependency tracking;

selecting a dependent cell of the set of dependent cells;

determining a set of source locations based at least in part on a dependency pattern associated with the selected dependent cell; and recalculating a value of the set of source locations, comprising reevaluating a formula that depends on the selected dependent cell.

2. The system of claim 1, wherein the processor is further to determine a primary dimension associated with the cell.

3. The system of claim 2, wherein the processor is further to determine a set of primary dimension values associated with the primary dimension.

4. The system of claim 1, wherein the dependency pattern is one of a plurality of available dependency patterns.

5. The system of claim 1, wherein the set of source locations is determined by aggregating source locations identified using the dependency pattern.

6. The system of claim 1, wherein a source location of the set of source locations comprises a second source location of a second set of source locations based at least in part on a second group of one more primary dimension values and a second dependency pattern associated with a second dependency of the group of dependencies.

7. The system of claim 1, wherein the processor is further to:

use a location of the set of source locations to determine a subsequent set of source locations associated with the location.

8. The system of claim 1, wherein the dependency pattern indicates that all non-primary dimensions are specified by inheritance based on a location of the selected dependent cell.

9. The system of claim 1, wherein the dependency pattern indicates that a level dimension value is specified by inheritance based on a location of the selected dependent cell.

10. The system of claim 1, wherein the dependency pattern indicates that no dimension values are specified by inheritance based on a location of the selected dependent cell.

11. The system of claim 1, wherein the dependency pattern indicates that a set of dimension values are specified using qualifiers associated with the selected dependent cell.

12. The system of claim 1, wherein the dependency pattern comprises a cross version pattern.

13. The system of claim 1, wherein the dependency pattern comprises a version-specific pattern.

14. The system of claim 1, wherein the hypercube includes a source subcube and a destination subcube, and wherein a source subcube data structure is mapped to a destination subcube data structure enabling faster access to data between the source subcube and the destination subcube.

15. A method for updating the hypercube, comprising:

receiving an indication to update a cell of the hypercube; and updating, using a processor, a portion of the hypercube, comprising:

updating the cell of the hypercube;

determining a set of dependent cells that depend on the cell using pattern-based dependency tracking;

selecting a dependent cell of the set of dependent cells;

determining a set of source locations based at least in part on a dependency pattern associated with the selected dependent cell; and recalculating a value of the set of source locations, comprising reevaluating a formula that depends on the selected dependent cell.

16. A computer program product for updating the hypercube, the computer program product being embodied in a non-transitory computer readable storage medium and comprising computer instructions for:

receiving an indication to update a cell of the hypercube; and updating a portion of the hypercube, comprising:

updating the cell of the hypercube;

determining a set of dependent cells that depend on the cell using pattern-based dependency tracking;

selecting a dependent cell of the set of dependent cells;

determining a set of source locations based at least in part on a dependency pattern associated with the selected dependent cell; and recalculating a value of the set of source locations, comprising reevaluating a formula that depends on the selected dependent cell.

17. The system of claim 1, wherein the dependency pattern indicates relationships of dependencies within planning system data.

* * * * *